United States Patent
Minh et al.

(10) Patent No.: US 11,265,231 B2
(45) Date of Patent: *Mar. 1, 2022

(54) REAL-TIME RANKING OF MONITORED ENTITIES

(71) Applicant: Cisco Technology, Inc., San Jose, CA (US)

(72) Inventors: Chi Cao Minh, San Mateo, CA (US); Jad Naous, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 154 days.

This patent is subject to a terminal disclaimer.

(21) Appl. No.: 16/512,749

(22) Filed: Jul. 16, 2019

(65) Prior Publication Data

US 2019/0342189 A1    Nov. 7, 2019

Related U.S. Application Data

(63) Continuation of application No. 15/143,037, filed on Apr. 29, 2016, now Pat. No. 10,419,303.

(51) Int. Cl.
*H04L 12/26* (2006.01)
*H04L 43/022* (2022.01)
*G06F 11/30* (2006.01)
*H04L 43/0817* (2022.01)

(52) U.S. Cl.
CPC ............ *H04L 43/022* (2013.01); *G06F 11/30* (2013.01); *H04L 43/0817* (2013.01)

(58) Field of Classification Search
CPC ..... H04L 43/022; H04L 43/0817; G06F 11/30
USPC ........................................ 707/748, 751, 752
See application file for complete search history.

(56) References Cited

U.S. PATENT DOCUMENTS

| 7,334,092 | B1 | 2/2008 | Wang | |
|---|---|---|---|---|
| 2007/0033365 | A1* | 2/2007 | Vaidyanathan | G06F 11/3452 711/170 |
| 2009/0228546 | A1 | 9/2009 | Yendluri | |
| 2010/0179979 | A1* | 7/2010 | Kadashevich | G06F 11/3419 709/202 |
| 2010/0299377 | A1* | 11/2010 | Rimer | G06F 16/80 707/769 |
| 2013/0061167 | A1* | 3/2013 | Rhodes | G06F 9/5022 715/781 |
| 2015/0161205 | A1* | 6/2015 | Beach | G06F 16/50 707/748 |
| 2016/0196157 | A1 | 7/2016 | Kodama | |
| 2016/0217022 | A1* | 7/2016 | Velipasaoglu | G06F 11/0772 |
| 2016/0357623 | A1* | 12/2016 | Oishi | G06F 11/30 |

* cited by examiner

*Primary Examiner* — Hares Jami
(74) *Attorney, Agent, or Firm* — Behmke Innovation Group LLC; James M. Behmke; James J. Wong

(57) ABSTRACT

The disclosed technology includes ranking entities in real-time to show the relative importance of those entities. The ranking is based on attributes of the entities that vary in real-time. An example of an entity is a process (e.g., an executing computer program) and the associated attributes can include the process' current CPU memory consumption. While the process runs, its CPU and memory consumption vary in real-time.

20 Claims, 6 Drawing Sheets

REAL-TIME RANKING OF MONITORED ENTITIES

RELATED APPLICATION

This application is a continuation of U.S. patent application Ser. No. 15/143,037, filed on Apr. 29, 2016, entitled REAL-TIME RANKING OF MONITORED ENTITIES, by Chi Cao Minh et al., the contents of which are hereby incorporated by reference.

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations for ranking monitored entities based on real-time varying attribute values are disclosed.

In one aspect, a system for real-time ranking of entities in a monitored environment is disclosed. The system includes a processor; a memory; and one or more modules stored in the memory. The one or more modules are executable by the processor to perform operations including: sample values of attributes for entities running on a monitored environment; generate time series for the sampled values of attributes; generate smoothed time series by applying a curve fitting technique to the generated time series; sort smoothed time series for each attribute based on a sort order to assign a attribute rank for each attribute; generate a combined value for each entity by combining the sorted smoothed time series for all of the attributes of each entity; and sort the entities by the combined value based on the sort order to assign an entity rank for each entity.

The system can be implemented in various ways to include one or more of the following features. For example, the monitored environment can include a machine, the entities can include processes running on the machine, and the attributes can include CPU usage and memory usage. The curve fitting technique can include a weighted moving average. The weighted moving average ca include unequally weighted moving average. The sort order can include ranking higher values higher ranks. The one or more modules stored in the memory and executable by the processor can be operable to perform operations including applying a tie-breaker rule to break any ties in the attribute rank. The tie-breaker rule can include using the values of other attributes. The tie-breaker rule can include sorting by a unique and sortable identifier assigned to each entity. The combined value for each entity can include a weighted average of each attribute's sorted rank for each entity. The system can be configured to limit output data based on the entity rank.

In another aspect, a method for real-time ranking of entities in a monitored environment is disclosed. The includes sampling, at a sampling rate, values of attributes for entities running on a monitored environment; generating time series for the sampled values of attributes; sorting the generated time series of each attribute based on a sort order to assign a attribute rank for each attribute; sorting the entities by combining the assigned attribute ranks for all of the attributes of the entities based on the sort order to assign an entity rank for each entity; and outputting data associated with the ranked entities.

The method can be implemented in various way to include one or more of the following features. For example, sorting the generated time series can include generating smoothed time series by applying a curve fitting technique to the generated time series; and sorting smoothed time series for each attribute based on the sort order to assign the attribute rank for each attribute. The sorting the entities can include generating a combined value for each entity by combining the sorted smoothed time series for all of the attributes of each entity; and sorting the entities by the combined value based on the sort order to assign the entity rank for each entity. The monitored environment can include a machine, the entities can include processes running on the machine, and the attributes can include CPU usage and memory usage. The curve fitting technique can include a weighted moving average. The weighted moving average can include equally weighted moving average. The sort order can include ranking lower values higher ranks. The method can include applying a tie-breaker rule to break any ties in the attribute rank. The tie-breaker rule can include sorting by a unique and sortable identifier assigned to each entity. The combined value for each entity can include a weighted average of each attribute's sorted rank for each entity.

In another aspect, a non-transitory computer readable medium embodying instructions when executed by a processor to cause operations to be performed is disclosed. For example, the operations performed can include sampling, at a sampling rate, values of attributes for entities running on a monitored environment; generating time series for the sampled values of attributes; sorting the generated time series of each attribute based on a sort order to assign a attribute rank for each attribute; sorting the entities by combining the assigned attribute ranks for all of the attributes of the entities based on the sort order to assign an entity rank for each entity; and outputting data associated with the ranked entities.

The non-transitory computer readable medium can be implemented in various ways to include one or more of the following features. For example, sorting the generated time series can include generating smoothed time series by applying a curve fitting technique to the generated time series; and sorting smoothed time series for each attribute based on the sort order to assign the attribute rank for each attribute.

DETAILED DESCRIPTION

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. When monitoring multiple applications that touch multiple servers, determining the performance of a particular application can often be difficult. A given event on a given server or tier of application nodes may often affect a remote application. Manually reviewing and processing the performance data of each and every application on multiple servers to detect the event causing a problem is extremely time consuming exercise that may never lead to an adequate solution to the performance degradation problem.

As the complexity of the monitored environment increases, the amount of monitored data increases and the ability to identify the important data from the vast amount of monitored data becomes increasingly difficult. Moreover, the ability to store the vast amount of monitored data becomes difficult and costly.

The technology disclosed in this patent document provides for dynamic and efficient application intelligence platforms, systems, devices, methods, and computer readable media including non-transitory type that embody instructions for causing a machine including a processor to perform various operations disclosed in this patent document to obtain the desired application intelligence data. Specifically, the disclosed technology provides for real-time identification of monitored entities that are currently the most important with regards to resource consumption. The ability to perform real-time ranking as disclosed can provide a number of advantages. For example, the real-time ranking can improve troubleshooting by allowing the user to focus on the top offenders of resource usage within the monitored environment. Also, the real-time ranking can be customized to allow a given user to identify desired monitored entities to be ranked high. Moreover, the disclosed technology for real-time ranking allows to reduce the storage requirement by identifying the relevant data to be stored and ignoring the irrelevant data. The total number of processes per machine monitored can be large (e.g., more than 100 processes per machine), and thus the disclosed technology for real-time ranking allows for much lower data storage requirements on the controller as the total number of processes per machine increases.

Real-Time Ranking of Entities Based on Varying Attributes Overview

In an application intelligence platform, agents are deployed to monitor an application environment. The deployed agents send the monitored data to the controller for processing and storing the monitored data. As the agents collect more and more monitored data, the disclosed technology for real-time ranking can be used to prioritize the monitored data by ranking the vast amount of monitored data so that the most relevant data is presented to the users through the controller. Applying the ranking using the disclosed technology allows the users to easily and quickly find the data of interest. In addition, the real-time ranking provided by the disclosed technology allows the vast amount of monitored data to be stored intelligently and efficiently by eliminating the need to store data that is irrelevant to the users.

The disclosed technology for ranking entities in real-time is based on attributes of the entities that vary in real-time. An example of an entity is a process, such as an executing computer program, and the associated attributes can include the current CPU and memory consumption. While the process runs, its CPU and memory consumption vary in real-time, and based on this time-based variance in CPU and memory consumption, the process can be ranked relative to other processes.

Real-Time Ranking Based on Varying Attribute Values Techniques

FIGS. 1A, 1B, 1C, 1D, and 1E are process flow diagrams showing exemplary techniques, such as method 100 for real-time ranking of monitored entities based on varying attribute values. The method 100 illustrated and described with respect to FIG. 1A can be combined with any number of additional techniques and sub-techniques from FIGS. 1B, 1C, 1D, and 1E. Also, while possible, not all of the additional techniques and sub-techniques illustrated and described with respect to FIGS. 1B, 1C, 1D, and 1E need to be performed together and techniques illustrated in any of the FIGURES can be combined with techniques in any other FIGURE or FIGURES.

The real-time ranking technique 100 can be performed by each agent that monitors an application environment, such as a corresponding server machine. An application intelligence architecture that includes agents and controllers in communications with one another according to the disclosed technology is described below with respect to FIGS. 2, 3, and 4. In this manner, each agent can generate a ranking specific for the machine monitored. Thus at least some of the monitored data processing and intelligence is pushed to the agents rather than being exclusively being performed at the controller.

In some implementations, the real-time ranking technique 100 can be performed by a combination of multiple agents together with the connected controller. This may be useful when monitoring a number of machines in a node and the controller can receive machine specific ranking from the corresponding agents and create an overall ranking for all the machines in a node. In this manner, the machines in a node can be ranked to determine which machine is using the most (or least) amount of resources.

Figure 1A:
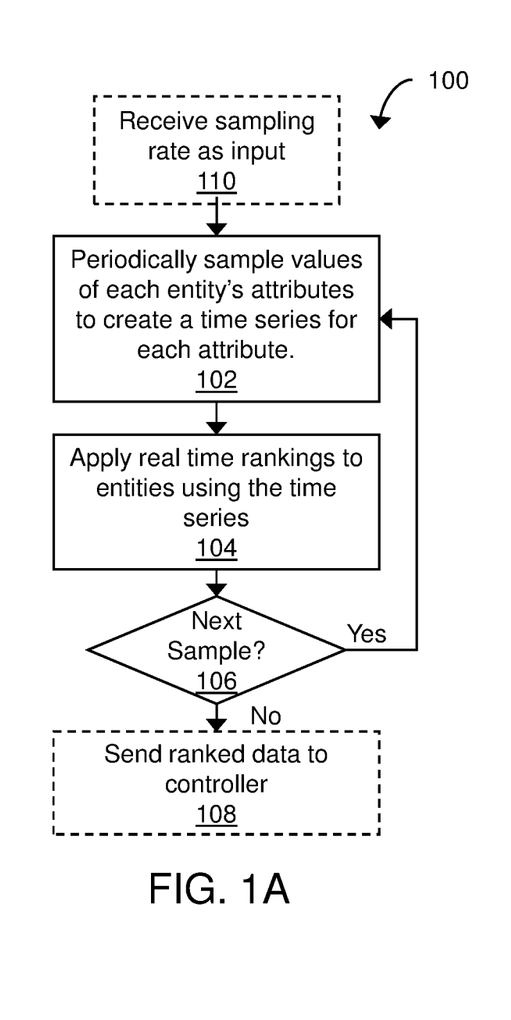
FIGS. 1A, 1B, 1C, 1D, and 1E are process flow diagrams showing exemplary techniques for real-time ranking of entities at a monitored machine based on varying attribute values of the entities.

FIG. 1A illustrates the process flow diagram for an exemplary technique 100 for real-time ranking of entities in a monitored application environment. Examples of entities can depend on the type of monitoring being performed by the agent. For example, for server or machine monitoring, the entities to be ranked can be the processes running on the server or machine. Other examples are described below. The values of each entity's attributes are sampled periodically (e.g., every 2 seconds, every 30 seconds) to create a time series for each attribute (102). The sampling rate can vary depending on the time granularity or resolution of the sampled data. Real-time rankings are applied to the monitored entities using the time series (104). The sampling (102) and real-time ranking as shown in FIG. 1A are performed by the agents that monitor and collect data from the monitored environment, such as a server or a machine. Sampling (106) of the monitored data continues to obtain the real-time ranking while the application environment is monitored. The obtained real-time ranking can be sent to the controller at the end of each sampling and ranking period, for example (108).

In some implementations, sampling of the values (102) can be controlled through adjusting the sampling rate received as an input (e.g., through a user interface client) (110). The sampling rate can be adjusted by the user through a user interface client served by the controller.

Figure 1B:
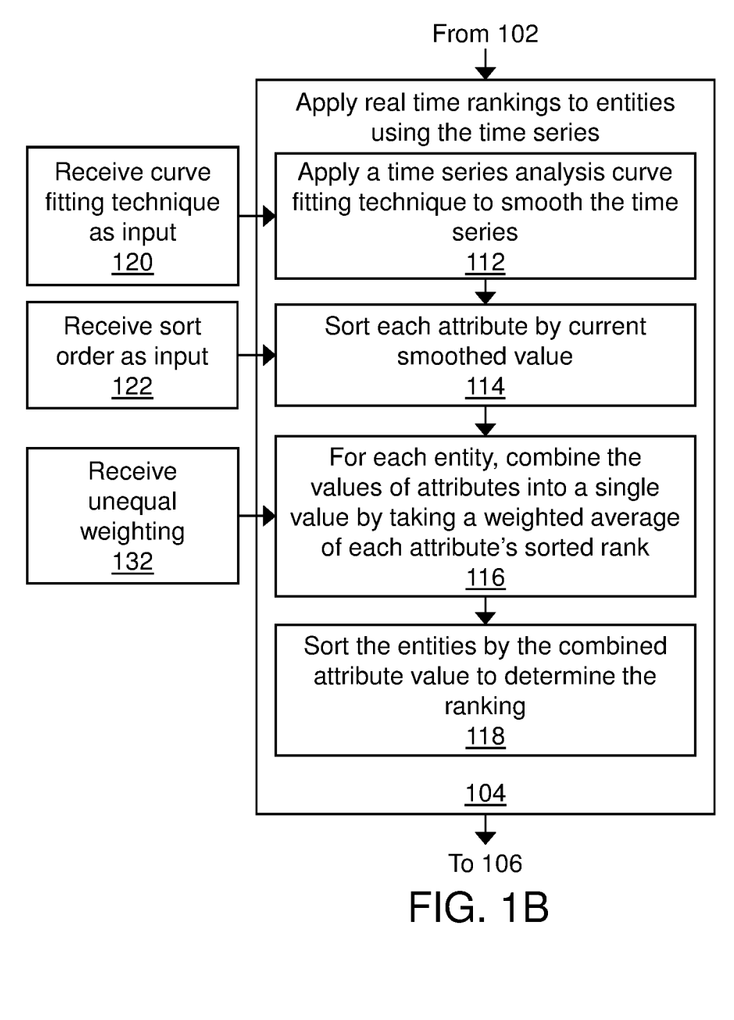

FIG. 1B is a process flow diagram illustrating an exemplary technique for applying real-time rankings to the entities. A time series analysis curve fitting technique is applied to the generated time series to smooth the time series for each attribute (112). The smoothing is used to eliminate noise. Thus, smoothing is useful for attributes that can sporadically vary by a large amount over time. Examples of curve fitting technique include exponentially-weighted moving average. Another example of a smoothing function is a simple moving average (i.e., equally-weighted samples). In some implementations, a specific curve fitting technique can be received as an input (120) to the curve fitting technique application method (112). Each attribute for each entity can be sorted by the current smoothed value (114). In some implementations, a specific sort order can be received as an input (122) to the sorting of each attribute method (114). The sort order can indicate whether smaller values should be ranked lower or higher. For each entity, the values of the entity's attributes can be combined into a single value by taking a weighted average of each attribute's sorted rank (116). In some implementations, the unequal weighting can be received as an input to the algorithm to increase the relative importance of specific attributes (132). The entities can be sorted by their combined attribute value determined previously (116) to determine the ranking of the entities (118).

Figure 1C:
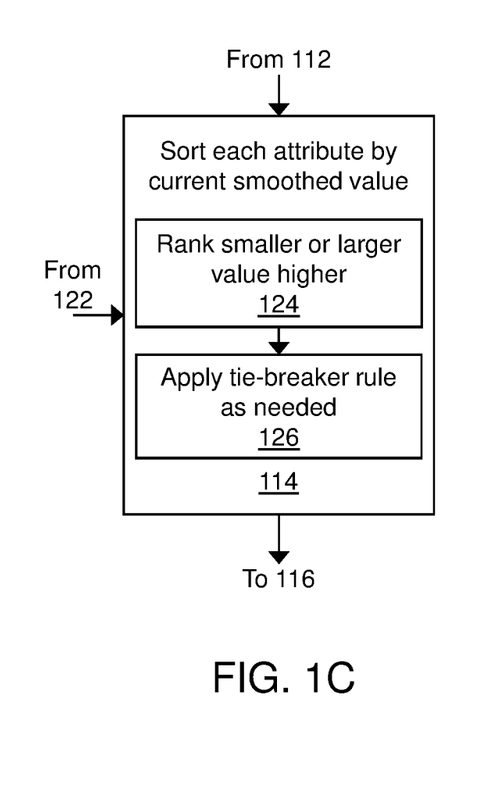

FIG. 1C is a process flow diagram of an exemplary technique for sorting each attribute by current smoothed value (114). The sorting (114) can be based on an order that determines whether smaller values should be ranked higher or whether larger values should be ranked higher (124). The sorting (114) can address any ties in the rankings by applying a tie-breaker rule as needed (126). To break ties while sorting each attribute, the values of other attributes can be used. Alternatively, a unique and sortable identifier can also be assigned to each entity to serve as a tiebreaker.

Figure 1D:
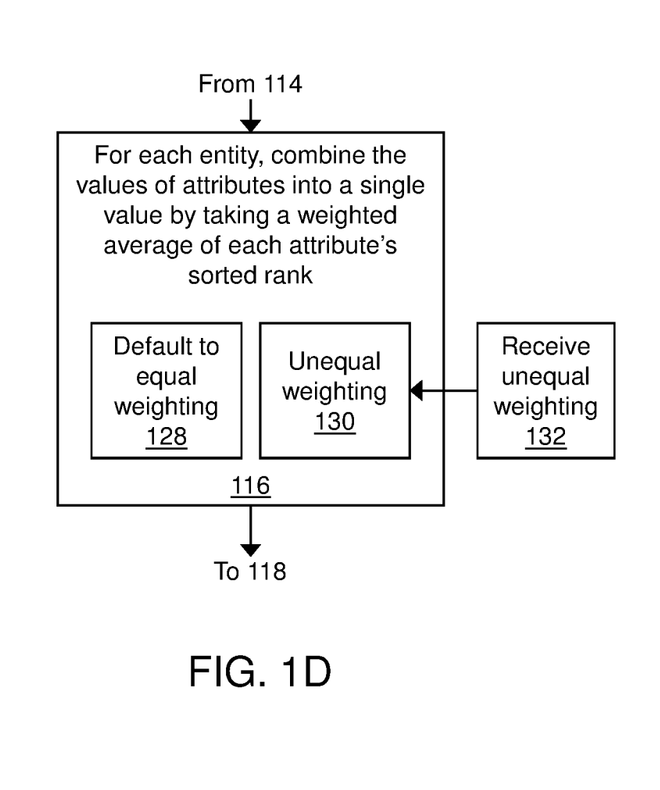

FIG. 1D is a process flow diagram of an exemplary technique for combining the values of attributes into a single value by taking a weighted average of each attribute's sorted rank (116). The default can be preset to use an equal weighting (128). In some implementations, unequal weighting can be used (130). The unequal weighting can be received as an input to the algorithm to increase the relative importance of specific attributes (132).

Figure 1E:
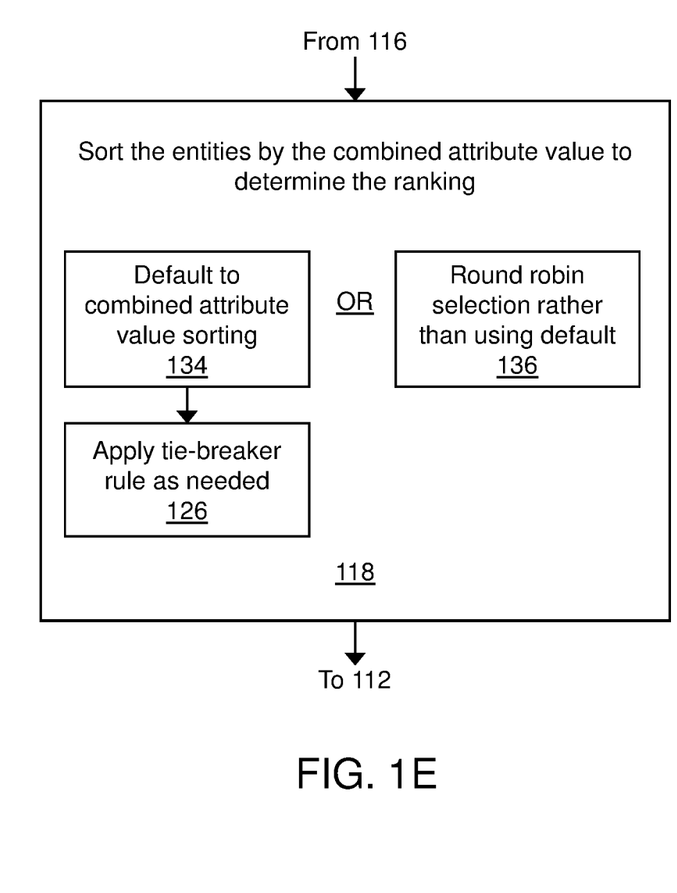

FIG. 1E is a process flow diagram of an exemplary technique for sorting the entities (118). The default can be preset to sort the entities using the combined attribute value (134) determined in FIG. 1E. For the specific use case of applying equal weighting of the attributes, the entities can be ranked by a selection performed via round robin of the attributes (136). For example, with the CPU and memory usage attributes of processes, round robin will result in: #1 cpu, #1 memory, #2 cpu, #2 memory, etc. The round robin selection can be performed instead of computing the combined attribute value and sorting based on the combined attribute value. To break ties, the same tie-breaker methods (126) described in FIG. 1D can be used.

Examples of Entities and Entities Ranked

The disclosed technology for real-time ranking of entities can be applied to rank a number of different entities and associated attributes depending on the monitoring being performed by the agents. As shown in the below examples, multiple attributes can be associated for each entity and a numerical value is assigned to each attribute.

For example, for application performance monitoring, different business transactions can be ranked. The associated attributes for business transactions can include load (calls per minute) and average response time (msec).

For end user monitoring, examples of entities can include different web pages can be ranked. The associated attributes for the web pages include the number of requests, the end user response time (msec), DOM ready time (msec), and first byte time (sec).

For database monitoring, examples of entities can include different databases. The associated attributes for the databases can include the number of queries, the time in database (sec), and CPU usage (%).

For server monitoring, examples of entities can include different processes, the various disks, and the different machines. The associated attributes for different processes can include CPU usage (%) and memory usage (KB). The associated attributes for the disk can include space usage (%) and 110 operations per second. The associated attributes for the machine can include CPU usage (%), memory usage (%), disk space usage (%), and network bandwidth usage (%).

Exemplary Use Cases

The disclosed real-time ranking can be used to find the entities (e.g., processes running on the monitored machine) currently consuming the most resources within the monitored machine. In addition, the disclosed real-time ranking can be used to identify the machines within a data center that are consuming the least or most disk space and network traffic. In some implementations, the same filtering can be customized to identify user specific entities. By ranking the entities based on real-time varying attribute values, the disclosed technology can be used to quickly identify those that are currently the most important (i.e., the top few by ranked order). For example, in some implementations, the real-time ranking technique can be used to identify the lowest resource consumers. One example use case for identifying the lowest resource consuming entities is to highlight lightly-loaded machines available for deployment of additional applications.

Example Implementation for Identifying Top Resource Consuming Processes

As described above, the disclosed techniques for real-time ranking of entities based on time varying attribute values can be used to ranking a number of different entities. For example, the disclosed real-time ranking techniques can be used to identify the top three processes that are consuming the most CPU and memory resources at a given machine.

In this exemplary real-time ranking, the sampling rate is set as sampling every 30 seconds. Using the sampling rate, the current CPU and memory usage of all processes running on the machine. For each process running on the machine, two time series (CPU usage and memory usage) are created. Tables 1 and 2 below show the time series for processes running on the machines and illustrate the ranking technique to identify the top resource consuming processes. For illustrated purposes, only five of the processes are shown but more than five processes can be monitored and ranked.

At time=N, Table 1 shows the resource usage for the five processes bash, Web browser, java, mail, and streaming music.

TABLE 1

Real-time monitored processes at time = N

| Process | CPU Usage (%) | Memory Usage (%) |
|---|---|---|
| bash | 5 | 5 |
| Web browser | 10 | 30 |
| java | 40 | 20 |
| mail | 10 | 10 |
| streaming music | 5 | 10 |
| ... | | |

As shown in Table 2, at time=N+30, the resource usage for the processes have changed for the Web browser and java. The memory usage for the Web browser increased from 30 to 50% and the CPU usage for java decreased from 40 to 20%.

TABLE 2

Real-time monitored processes at time = N + 10

| Process | CPU Usage (%) | Memory Usage (%) |
|---|---|---|
| bash | 5 | 5 |
| Web browser | 10 | 50 |
| java | 20 | 20 |
| mail | 10 | 10 |
| streaming music | 5 | 10 |
| ... | | |

A smoothing function is applied to each time series to remove noise. For example, the smoothing function applied can include a simple moving average of the past 2 samples (e.g., over the past 1 minute). Application of the smoothing function, such as a moving average creates an additional two time series for each process as shown in Table 3.

TABLE 3

Smoothing function applied to real-time monitored processes at time = N + 10

| Process | CPU Usage (%) | Memory Usage (%) |
|---|---|---|
| bash | 5 | 5 |
| Web browser | 10 | 40 |
| java | 30 | 20 |
| mail | 10 | 10 |
| streaming music | 5 | 10 |
| ... | | |

As shown in Table 3 above, the memory usage for the Web browser changed from 50 to 40% and the CPU usage for java changed from 20 to 30%.

The smoothing function applied time series for the processes are sorted for each attribute. For example, each process can be sorted by the smoothed CPU usage to obtain a CPU rank for each process. Similarly, each process can be sorted by the smoothed memory usage to obtain a memory rank for each process. In this example, the order of ranking applied is to rank the higher attribute values higher. To break ties, the other attributes can be used with the final tie-breaker being the entity unique identifier (e.g., process name). Table 4 shows a real-time ranking based on the smoothed time series.

TABLE 4

Real-time ranking based on the smoothed time series

| Process | CPU Usage (%) | Memory Usage (%) | CPU Rank | Memory Rank |
|---|---|---|---|---|
| bash | 5 | 5 | 5 | 5 |
| Web browser | 10 | 40 | 2 | 1 |
| java | 30 | 20 | 1 | 2 |
| mail | 10 | 10 | 3 | 3 |
| music streaming | 5 | 10 | 4 | 4 |
| ... | | | | |

As shown in Table 4 above, the java process is ranked highest (1) for consuming the most CPU resource while the bash process is ranked lowest (5) for consuming the lowest CPU resource. Also, the Web browser process is ranked highest (1) for consuming the highest memory resource while the bash process is ranked the lowest (5) for consuming the lowest CPU resource.

An average rank for each process is computed by taking a weighted average of the per-attribute ranks. The weights can be adjusted if a particular attribute is more or less interesting. The adjusted weights can be provided as an input from the user, for example. Using an equal weighting of importance between CPU % and Mem %, an average ranking of the processes can be obtained as shown in Table 5.

TABLE 5

Average ranking of processes

| Process | CPU Usage (%) | Memory Usage (%) | CPU Rank | Memory Rank | Average |
|---|---|---|---|---|---|
| bash | 5 | 5 | 5 | 5 | 5 |
| Web browser | 10 | 40 | 2 | 1 | 1.5 |
| java | 30 | 20 | 1 | 2 | 1.5 |
| mail | 10 | 10 | 3 | 3 | 3 |
| music streaming | 5 | 10 | 4 | 4 | 4 |
| ... | | | | | |

Table 6 below shows the final ranking for the monitored processes.

TABLE 5

Final ranking of processes

| Process | CPU Usage (%) | Memory Usage (%) | CPU Rank | Memory Rank | Final Rank |
|---|---|---|---|---|---|
| java | 30 | 20 | 1 | 2 | 1 |
| Web browser | 10 | 40 | 2 | 1 | 1 |
| mail | 10 | 10 | 3 | 3 | 3 |
| music streaming | 5 | 10 | 4 | 4 | 4 |
| bash | 5 | 5 | 5 | 5 | 5 |
| ... | | | | | |

Application Intelligence Platform Architecture

Figure 2:
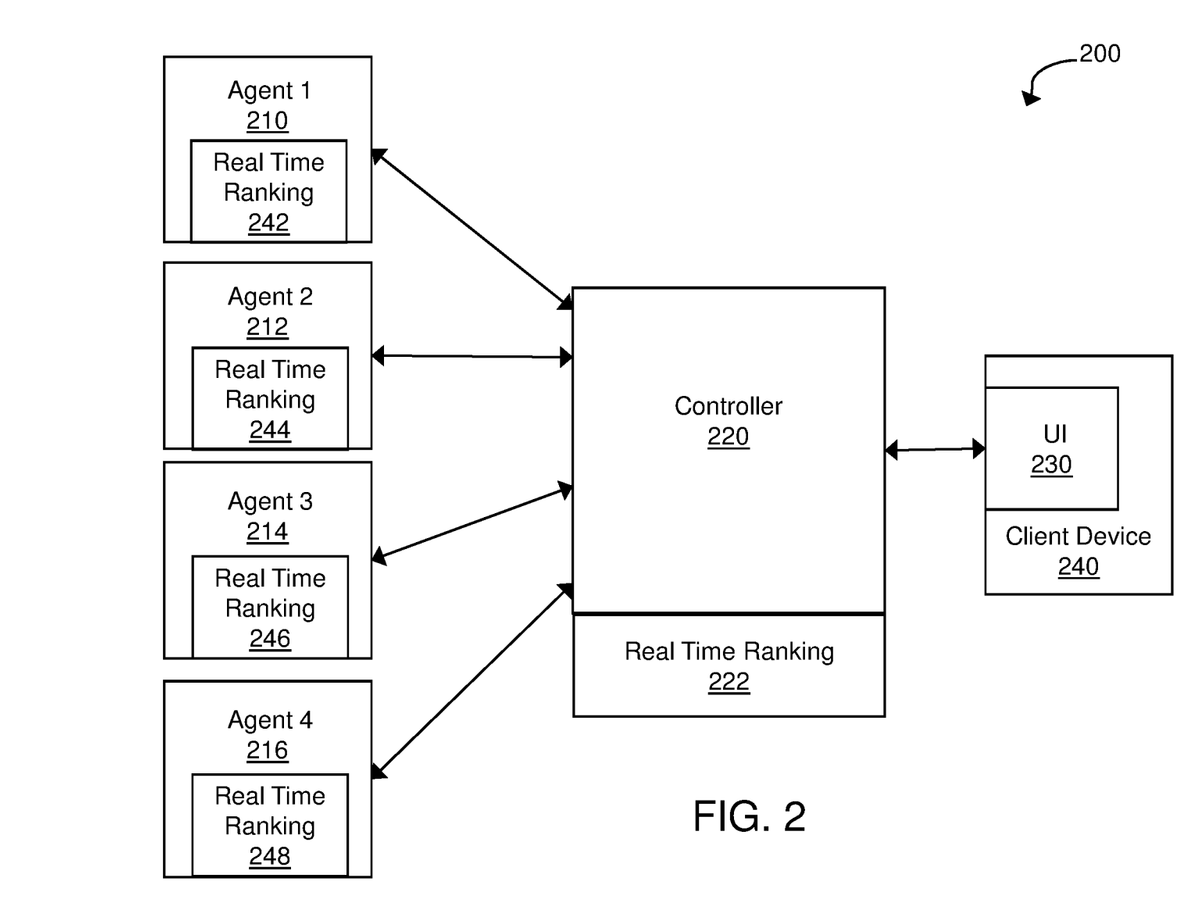
FIG. 2 is a block diagram of an exemplary application intelligence platform that can implement the real-time ranking of entities based on varying attribute values using the disclosed technology, including the processes disclosed with respect to FIGS. 1A through 1E.

The disclosed technology for real-time ranking of entities based on time varying attribute values can be implemented in agents and in some implementations in agents and controllers of an application intelligence platform. FIG. 2 is a block diagram of an exemplary application intelligence platform 200 that can implement the real-time ranking as disclosed in this patent document. The application intelligence platform is a system that monitors and collect metrics of performance data for an application environment being monitored. At the simplest structure, the application intelligence platform includes one or more agents 210, 212, 214, 216 and one or more controllers 220. While FIG. 2 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 220 is the central processing and administration server for the application intelligence platform. The controller 220 serves a browser-based user interface (UI) 230 that is the primary interface for monitoring, analyzing, and troubleshooting the monitored environment. The controller 220 can control and manage monitoring of business transactions distributed over application servers. Specifically, the controller 220 can receive runtime data from agents 210, 212, 214, 216 and coordinators, associate portions of business transaction data, communicate with agents to configure collection of runtime data, and provide performance data and reporting through the interface 230. The agent of the agents 210, 212, 214, 216 can include corresponding real-time ranking systems or modules 242, 244, 246, 248 for performing the real-time ranking as disclosed in this patent document. The interface 230 may be viewed as a web-based interface viewable by a client device 240. In some implementations, a client device 240 can directly communicate with controller 220 to view an interface for monitoring data. In some implementations where the overall ranking is obtained by combining the data from multiple agents, the controller 220 can include a real-time ranking system or module to rank the data from the multiple agents. For example, when multiple machines (each machine monitored by a corresponding agent) are ranked for a node, each agent generates a ranking for the corresponding machine in the node. The controller accumulates the machine specific rankings from the multiple agents and generates the final ranking for all the machines in the node.

In the Software as as Service (SaaS) implementation, a controller instance 220 is hosted remotely by a provider of the application intelligence platform 200. In the on-premise (On-Prem) implementation, a controller instance 220 is installed locally and self-administered.

The controllers 220 receive data from different agents 210, 212, 214, 216 deployed to monitor applications, databases and database servers, servers, and end user clients for the monitored environment. Any of the agents 210, 212, 214, 216 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows between tiers and can be visualized in a flow map using lines between tiers. In addition, the lines indicating the traffic flows between tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Jules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 3:
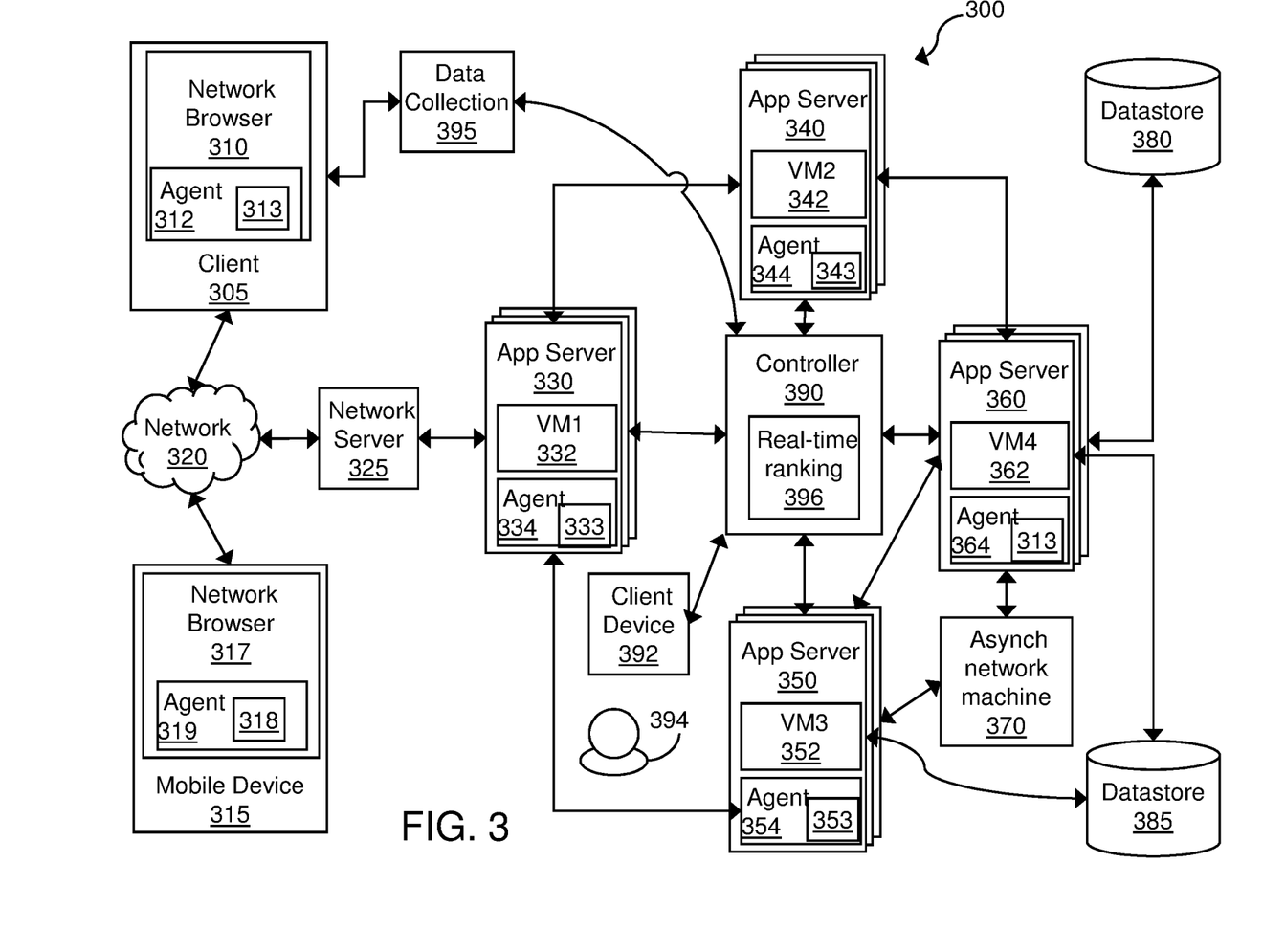
FIG. 3 is a block diagram of an exemplary implementation of the application intelligence platform for real-time ranking of monitored entities based on varying attribute values using the disclosed technology, including the processes disclosed with respect to FIGS. 1A through 1E.

FIG. 3 is a block diagram of an exemplary system 300 for real-time ranking of entities based on time varying attribute values as disclosed in this patent document, including the techniques disclosed with respect to FIGS. 1A, 1B, 1C, 1D, and 1E. The system 300 in FIG. 3 includes client device 305 and 392, mobile device 315, network 320, network server 325, application servers 330, 340, 350 and 360, agents 312, 319, 334, 344, 354 and 364, asynchronous network machine 370, data stores 380 and 385, controller 390, and data collection server 395. The agents 312, 319, 334, 344, 354 and 364 can include real-time ranking systems or modules 313, 318, 333, 343, 353 and 363 for performing real-time ranking as disclosed in this patent document. In some implementations, the controller 390 can also include a real-time ranking system or module 396 for performing real-time ranking as disclosed in this patent document. For example, when rankings are generated across multiple agents, the controller can include the real-time ranking system or module 396 in addition to the real-time ranking systems or modules 313, 318, 333, 343, 353 and 363 in the agents 312, 319, 334, 344, 354 and 364. In some implementations, the real-time ranking system or module 396, 222 can be implemented in a separate machine (e.g., a server) different from the one hosting the controller 390.

Client device 305 may include network browser 310 and be implemented as a computing device, such as for example a laptop, desktop, workstation, or some other computing device. Network browser 310 may be a client application for viewing content provided by an application server, such as application server 330 via network server 325 over network 320.

Network browser 310 may include agent 312. Agent 312 may be installed on network browser 310 and/or client 305 as a network browser add-on, downloading the application to the server, or in some other manner. Agent 312 may be executed to monitor network browser 310, the operating system of client 305, and any other application, API, or other component of client 305. Agent 312 may determine network browser navigation timing metrics, access browser cookies, monitor code, and transmit data to data collection 360, controller 390, or another device. Agent 312 may perform other operations related to monitoring a request or a network at client 305 as discussed herein.

Mobile device 315 is connected to network 320 and may be implemented as a portable device suitable for sending and receiving content over a network, such as for example a mobile phone, smart phone, tablet computer, or other portable device. Both client device 305 and mobile device 315 may include hardware and/or software configured to access a web service provided by network server 325.

Mobile device 315 may include network browser 317 and an agent 319. Mobile device may also include client applications and other code that may be monitored by agent 319. Agent 319 may reside in and/or communicate with network browser 317, as well as communicate with other applications, an operating system, APIs and other hardware and software on mobile device 315. Agent 319 may have similar functionality as that described herein for agent 312 on client 305, and may repot data to data collection server 360 and/or controller 390.

Network 320 may facilitate communication of data between different servers, devices and machines of system 300 (some connections shown with lines to network 320, some not shown). The network may be implemented as a private network, public network, intranet, the Internet, a cellular network, Wi-Fi network, VoIP network, or a combination of one or more of these networks. The network 320 may include one or more machines such as load balance machines and other machines.

Network server 325 is connected to network 320 and may receive and process requests received over network 320. Network server 325 may be implemented as one or more servers implementing a network service, and may be implemented on the same machine as application server 330 or one or more separate machines. When network 320 is the Internet, network server 325 may be implemented as a web server.

Application server 330 communicates with network server 325, application servers 340 and 350, and controller 390. Application server 330 may also communicate with other machines and devices (not illustrated in FIG. 3). Application server 330 may host an application or portions of a distributed application. The host application 332 may be in one of many platforms, such as including a Java, PHP, .Net, and Node.JS, be implemented as a Java virtual machine, or include some other host type. Application server 330 may also include one or more agents 34 (i.e. "modules"), including a language agent, machine agent, and network agent, and other software modules. Application server 330 may be implemented as one server or multiple servers as illustrated in FIG. 3.

Application 332 and other software on application server 330 may be instrumented using byte code insertion, or byte code instrumentation (BCI), to modify the object code of the application or other software. The instrumented object code may include code used to detect calls received by application 332, calls sent by application 332, and communicate with agent 334 during execution of the application. BCI may also be used to monitor one or more sockets of the application and/or application server in order to monitor the socket and capture packets coming over the socket.

In some embodiments, server 330 may include applications and/or code other than a virtual machine. For example, servers 330, 340, 350, and 360 may each include Java code, .Net code, PHP code, Ruby code, C code, C++ or other binary code to implement applications and process requests received from a remote source. References to a virtual machine with respect to an application server are intended to be for exemplary purposes only.

Agents 334 on application server 330 may be installed, downloaded, embedded, or otherwise provided on application server 330. For example, agents 334 may be provided in server 330 by instrumentation of object code, downloading the agents to the server, or in some other manner. Agent 334 may be executed to monitor application server 330, monitor code running in a virtual machine 332 (or other program language, such as a PHP, .Net, or C program), machine resources, network layer data, and communicate with byte instrumented code on application server 330 and one or more applications on application server 330.

Each of agents 334, 344, 354 and 364 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 334 may detect operations such as receiving calls and sending requests by application server 330, resource usage, and incoming packets. Agent 34 may receive data, process the data, for example by aggregating data into metrics, and transmit the data and/or metrics to controller 390. Agent 334 may perform other operations related to monitoring applications and application server 330 as discussed herein. For example, agent 334 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 390 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 334 may create a request identifier for a request received by server 330 (for example, a request received by a client 305 or 315 associated with a user or another source). The request identifier may be sent to client 305 or mobile device 315, whichever device sent the request. In embodiments, the request identifier may be created when a data is collected and analyzed for a particular business transaction.

Each of application servers 340, 350 and 360 may include an application and agents. Each application may run on the corresponding application server. Each of applications 342, 352 and 362 on application servers 340-360 may operate similarly to application 332 and perform at least a portion of a distributed business transaction. Agents 344, 354 and 364 may monitor applications 342-362, collect and process data at runtime, and communicate with controller 390. The applications 332, 342, 352 and 362 may communicate with each other as part of performing a distributed transaction. In particular, each application may call any application or method of another virtual machine.

Asynchronous network machine 370 may engage in asynchronous communications with one or more application servers, such as application server 350 and 360. For example, application server 150 may transmit several calls or messages to an asynchronous network machine. Rather than communicate back to application server 350, the asynchronous network machine may process the messages and eventually provide a response, such as a processed message, to application server 360. Because there is no return message from the asynchronous network machine to application server 350, the communications between them are asynchronous.

Data stores 380 and 385 may each be accessed by application servers such as application server 350. Data store 385 may also be accessed by application server 350. Each of data stores 380 and 385 may store data, process data, and return queries received from an application server. Each of data stores 380 and 385 may or may not include an agent.

Controller 390 may control and manage monitoring of business transactions distributed over application servers 330-360. In some embodiments, controller 390 may receive application data, including data associated with monitoring client requests at client 305 and mobile device 315, from data collection server 360. In some embodiments, controller 390 may receive application monitoring data and network data from each of agents 312, 319, 334, 344 and 354. Controller 390 may associate portions of business transaction data, communicate with agents to configure collection of data, and provide performance data and reporting through an interface. The interface may be viewed as a web-based interface viewable by client device 392, which may be a mobile device, client device, or any other platform for viewing an interface provided by controller 390. In some embodiments, a client device 392 may directly communicate with controller 390 to view an interface for monitoring data.

Client device 392 may include any computing device, including a mobile device or a client computer such as a desktop, work station or other computing device. Client computer 392 may communicate with controller 390 to create and view a custom interface. In some embodiments, controller 390 provides an interface for creating and viewing the custom interface as a content page, e.g., a web page, which may be provided to and rendered through a network browser application on client device 392.

Applications 332, 342, 352 and 362 may be any of several types of applications.

Examples of applications that may implement applications 332-362 include a Java, PHP, .Net, Node.JS, and other applications.

Figure 4:
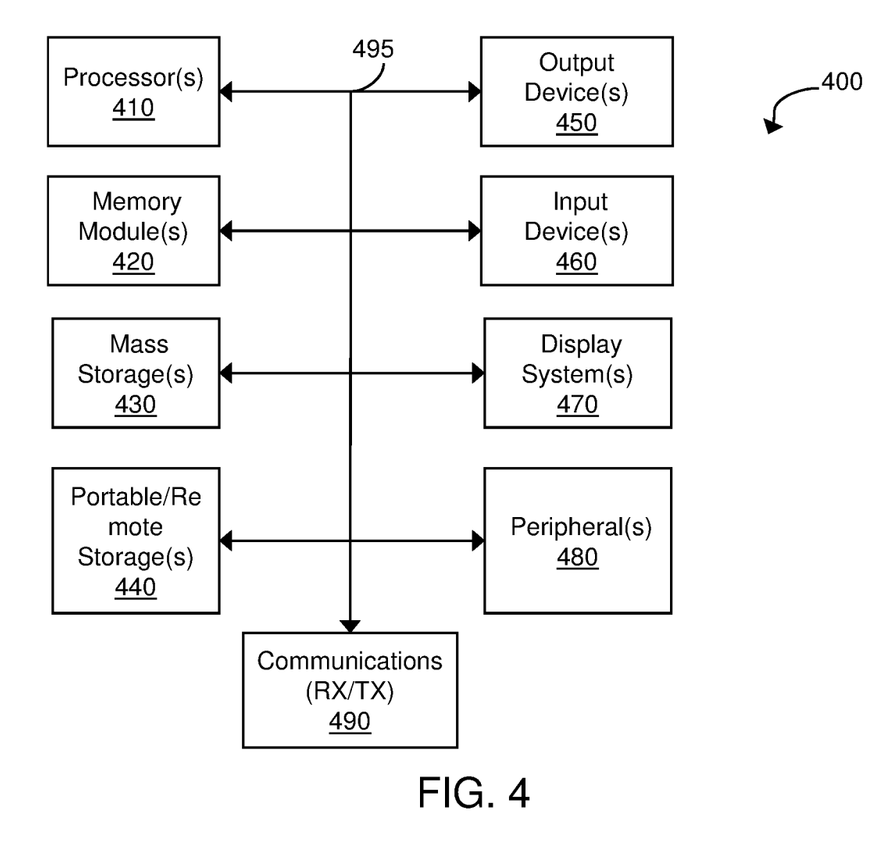
FIG. 4 is a block diagram of an exemplary computing system implementing the disclosed technology.

FIG. 4 is a block diagram of a computer system 400 for implementing the present technology. System 400 of FIG. 4 may be implemented in the contexts of the likes of clients 305, 392, mobile device 315, network server 325, servers 330, 340, 350, 360, a synchronous network machine 370 and controller 390.

The computing system 400 of FIG. 4 includes one or more processors 410 and memory 420. Main memory 420 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable or remote storage device 440, and display system 470 may be connected via one or more input/output (110) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 620.

Portable storage device 440 operates in conjunction with a portable non-volatile storage medium, such as a compact disk, digital video disk, magnetic disk, flash storage, etc. to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 400 of FIG. 4 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system comprising:
   a processor;
   a memory; and
   one or more modules stored in the memory and executable by the processor to perform operations in communication with a monitored environment comprising a computing device, the operations including:
   periodically sample a plurality of values for each of a plurality of attributes associated with a process running in the monitored environment to create a time series for the plurality of attributes;
   assign an attribute rank to each attribute of the process by sorting the time series for each of the plurality of attributes according to a sort order;
   generate a combined value for each process of a plurality of processes by taking a weighted average of the attribute rank associated with each of the plurality of attributes of the process;
   sort the plurality of processes using the combined value based on the sort order to assign a process rank to each process of the plurality of processes; and
   output data according to the process rank assigned to each process of the plurality of processes.

2. The system of claim 1, wherein the monitored environment includes a machine and the plurality of attributes include CPU usage and memory usage.

3. The system of claim 1, the operations including: generate a smoothed time series by applying a curve fitting technique to the smoothed time series, wherein the curve fitting technique includes a weighted moving average.

4. The system of claim 3, wherein weighted moving average includes an unequally weighted moving average.

5. The system of claim 1, wherein the sort order includes ranking higher values higher ranks.

6. The system of claim 1, the operations including:
   apply a tie-breaker rule to break any ties in the attribute rank.

7. The system of claim 6, wherein the tie-breaker rule includes using values of other attributes.

8. The system of claim 6, wherein the tie-breaker rule includes sorting by a unique identifier assigned to each process of the plurality of processes.

9. The system of claim 1, wherein the system is configured to limit output data based on the process rank.

10. A method comprising:
    periodically sampling, by an agent executing on a computing system in communication with a monitored environment comprising a computing device, a plurality of values for each of a plurality of attributes associated with a process running in the monitored environment to create a time series for the plurality of attributes;
    assigning, by the agent, an attribute rank to each attribute of the process by sorting the time series for each of the plurality of attributes according to a sort order;
    generating, by the agent, a combined value for each process of a plurality of processes by taking a weighted average of the attribute rank associated with each of the plurality of attributes of the process;
    sorting, by the agent, the plurality of processes using the combined value based on the sort order to assign a process rank to each process of the plurality of processes; and
    outputting data according to the process rank assigned to each process of the plurality of processes.

11. The method of claim 10, wherein sorting the time series includes:
    generating smoothed time series by applying a curve fitting technique to the time series; and
    sorting the smoothed time series for each of the plurality of attributes based on the sort order to assign the attribute rank for each attribute.

12. The method of claim 11, wherein the monitored environment includes a machine and the plurality of attributes include CPU usage and memory usage.

13. The method of claim 11, wherein the curve fitting technique includes a weighted moving average.

14. The method of claim 13, wherein the weighted moving average includes an equally weighted moving average.

15. The method of claim 13, wherein the sort order includes ranking higher values higher ranks.

16. The method of claim 11, further comprising:
    applying a tie breaker rule to break any ties in the attribute rank.

17. A non-transitory computer readable medium embodying instructions when executed by a processor to cause operations to be performed including:
    periodically sampling, by an agent executing on a computing system in communication with a monitored environment comprising a computing device, a plurality of values for each of a plurality of attributes associated with a process running in the monitored environment to create a time series for the plurality of attributes;
    assigning, by the agent, an attribute rank to each attribute of the process by sorting the time series for each attribute according to a sort order;
    generating, by the agent, a combined value for each process of a plurality of processes by taking a weighted average of the attribute rank associated with each of the plurality of attributes of the process;

sorting, by the agent, the plurality of processes using the combined value based on the sort order to assign a process rank to each process of the plurality of processes; and outputting data according to the process ranked assigned to each process of the plurality of processes.

18. The non-transitory computer readable medium of claim 17, wherein sorting the time series includes:
generating smoothed time series by applying a curve fitting technique to the time series; and
sorting the smoothed time series for each of the plurality of attributes based on the sort order to assign the attribute rank for each attribute.

19. The non-transitory computer readable medium of claim 17, the instructions when executed by the processor to cause operations to be performed further including:
applying a tie breaker rule to break any ties in the attribute rank.

20. The non-transitory computer readable medium of claim 17, wherein the monitored environment includes a machine and the plurality of attributes include CPU usage and memory usage.

\* \* \* \* \*

UNITED STATES PATENT AND TRADEMARK OFFICE
CERTIFICATE OF CORRECTION

PATENT NO. : 11,265,231 B2
APPLICATION NO. : 16/512749
DATED : March 1, 2022
INVENTOR(S) : Chi Cao Minh It is certified that error appears in the above-identified patent and that said Letters Patent is hereby corrected as shown below:

In the Specification

Column 6, Line 34, please amend as shown:
(%) and I/O operations per second. The associated attributes Column 8, Line 51, please amend as shown:
TABLE 6

Column 11, Line 39, please amend as shown:
application intelligence model. A business application con- Column 12, Line 65, please amend as shown:
Health Rules, Policies, and Actions Column 18, Line 25, please amend as shown:
connected via one or more input / output (I/O) buses.

In the Claims

Column 21, Line 5, Claim 17: please amend as shown:
outputting data according to the process rank assigned Signed and Sealed this
Twenty-fourth Day of May, 2022

Katherine Kelly Vidal
*Director of the United States Patent and Trademark Office*